J. T. CARRICK.
AGITATING AND SEPARATING MIXTURES OF SOLID MATTER AND LIQUIDS.
APPLICATION FILED JUNE 13, 1908.
912,541.  Patented Feb. 16, 1909.
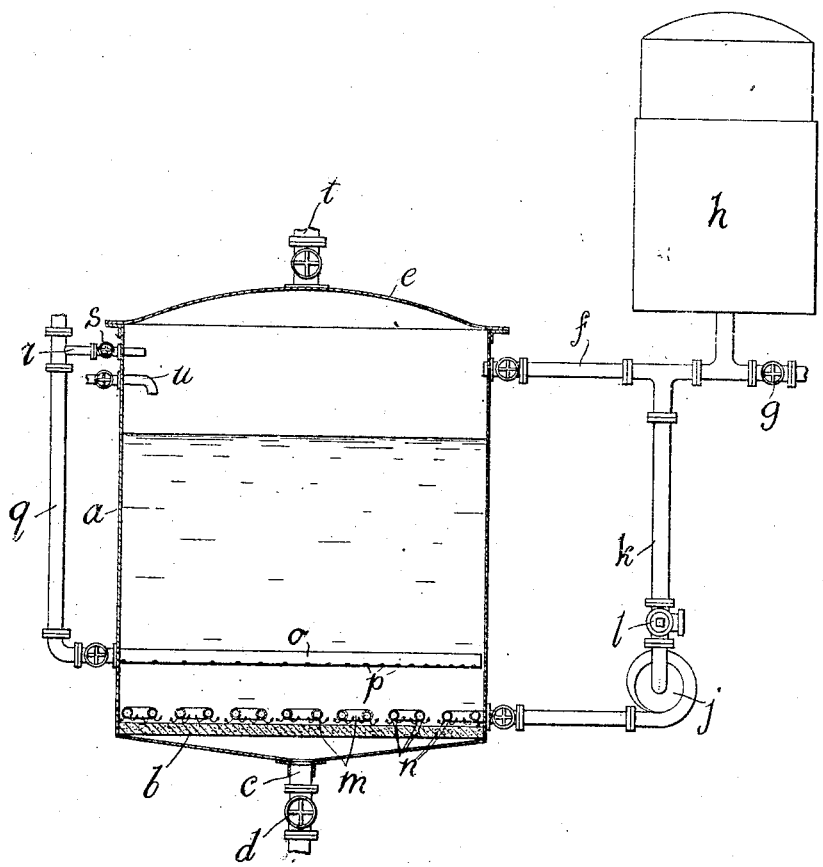
WITNESSES
W. P. Burke
W. M. Hopping
INVENTOR
James Taylor Carrick
BY
ATT'Y.

UNITED STATES PATENT OFFICE.

JAMES TAYLOR CARRICK, OF JOHANNESBURG, TRANSVAAL, ASSIGNOR OF ONE-HALF TO BASIL STUART PATTISON, OF JOHANNESBURG, TRANSVAAL.

AGITATING AND SEPARATING MIXTURES OF SOLID MATTER AND LIQUIDS.

No. 912,541.   Specification of Letters Patent.   Patented Feb. 16, 1909.

Application filed June 13, 1908. Serial No. 438,392.

*To all whom it may concern:*

Be it known that I, JAMES TAYLOR CARRICK, geologist, a subject of the King of Great Britain, residing at the New Club, Johannesburg, Transvaal, have invented new and useful Improvements in Agitating and Separating Mixtures of Solid Matter and Liquids, of which the following is a specification.

The present invention relates to the agitation of solid matter with liquid and their subsequent separation; and it is herein described as applied to the process of cuprous matte treatment which involves the steps of digesting the matte in acid, collecting the evolved sulfureted hydrogen for use as fuel, and the filtration of the digester liquor from the solid residues preparatory to their further treatment for the recovery of their valuable constituents.

The accompanying drawing is a diagrammatic view of apparatus for carrying out the process.

Therein $a$ represents a vessel having a false floor $b$ of filtering material, from the underside of which liquid may be withdrawn by means of a pipe $c$ controlled by a valve $d$. The vessel is furnished with a close fitting cover $e$.

The gas evolved during digestion is passed off from the upper part of the vessel $a$ by means of pipe $f$ controlled by a cock $g$, through which it is drawn off for use as required. A gas holder $h$ may be provided to equalize the supply.

$j$ represents a fan, the supply pipe $k$ of which may be connected by means of the cock $l$ either to the pipe $f$ or to the atmosphere. Such fan is arranged to force the gas or air under pressure to a series of pipes $m$ arranged in proximity to the filter medium $b$. From these pipes it is ejected through a large number of orifices $n$ preferably directed more or less towards the filter $b$ so that the issuing jets impinge thereon as indicated by the arrows.

In cases, such as the process of matte treatment referred to, where heat is required to bring about the requisite chemical operations steam pipes $o$ are arranged within the vat, such pipes being if desirable, provided with orifices $p$ by which the steam may be injected into the charge. From the pipe $q$ supplying said pipes $o$ a branch $r$ controlled by the valve $s$ is carried into the upper part of the vat.

$t$ is a valve by which the interior of the vat may be opened to atmosphere.

In operation, when a copper matte is being treated, the vessel having been charged with crushed matte and closed up, acid is fed in through pipe $u$ and the temperature raised to the required point by injecting steam through the orifices $p$, such injection also serving to preliminarily agitate the mass. Thereafter as gas is evolved, the necessary amount thereof is forced back by fan $j$ through the orifices $n$ so as to keep the whole contents of the vessel in a state of agitation. When the digestion of the matte is completed and the evolution of gas substantially ceases, the injection of the gas is stopped and the gas remaining above the liquid is driven off through valve $t$ by means of steam supplied through the branch $r$. There remains in the vat a close and heavy precipitate of cuprous sulfid which is difficult to filter off by the usual methods. Packing of this precipitate is however prevented by injecting air through the orifices $n$ by means of the fan $j$ during the time that the cock $d$ is opened for draining off the liquor, and thereby keeping the surface of the filter $b$ clear.

What I claim, and desire to secure by Letters Patent is:—

1. The process which consists in treating matte with a suitable liquid to generate gas and agitating the mass during digestion by injecting thereinto the necessary quantities of said evolved gas under pressure.

2. The process which consists in treating matte with a suitable liquid to generate gas, agitating the mass during digestion by injecting the necessary quantity of said evolved gas into the same, and subsequently drawing off the liquid through a filter medium while maintaining the mass in proximity to the filter in a state of agitation by means of gaseous jets.

3. The process of treating matte which consists in mixing the matte with acid, raising the temperature of the mixture, collecting the evolved gas and returning the necessary quantity of the same under pressure to agitate the mixture of matte and acid.

In testimony whereof I have signed my name to this specification in the presence of two subscribing witnesses.

JAMES TAYLOR CARRICK.

Witnesses:
  WM. HILLMAN VINCENT,
  ALFRED L. SPOOR.